United States Patent [19]

Alexis

[11] Patent Number: 4,638,479
[45] Date of Patent: Jan. 20, 1987

[54] METHOD OF TWO-WAY RADIOCOMMUNICATION BETWEEN FIXED STATIONS AND MOBILE STATIONS

[75] Inventor: Roger P. J. Alexis, Neuilly sur Seine, France

[73] Assignee: U.S. Philips Corporation, New York, N.Y.

[21] Appl. No.: 678,617

[22] Filed: Dec. 6, 1984

[30] Foreign Application Priority Data

Dec. 9, 1983 [FR] France ............................... 83 19749

[51] Int. Cl.$^4$ .......................... H04J 3/16; H04Q 7/00; H04B 1/00
[52] U.S. Cl. ....................................... 370/95; 455/33; 455/56
[58] Field of Search ...................... 370/95; 455/33, 54, 455/56

[56] References Cited

U.S. PATENT DOCUMENTS

| | | | |
|---|---|---|---|
| 4,414,661 | 11/1983 | Karlstrom | 455/56 |
| 4,419,766 | 12/1983 | Goeken et al. | 455/56 |
| 4,434,506 | 2/1984 | Fujiwara et al. | 455/56 |
| 4,475,010 | 10/1984 | Huensch et al. | 455/56 |
| 4,485,486 | 11/1984 | Webb et al. | 455/56 |

Primary Examiner—Douglas W. Olms
Assistant Examiner—Frank M. Scutch, III
Attorney, Agent, or Firm—Thomas A. Briody; Jack Oisher; William J. Streeter

[57] ABSTRACT

A method of two-way radiocommunication between fixed stations and mobile stations permitting effective utilization of available radiocommunication channels. All the fixed stations transmit in a first radio path of multiplexed communication channels and all the mobile stations transmit in a second radio path of multiplexed communication channels, each pair of communication channels in the first and second paths being capable of handling two-way communication between any one of the fixed stations and any one of the mobile stations. When the channels are time-division multiplexed, in accordance with the TDMA-type method, only two numerical paths are utilized. When the channels are frequency-division multiplexed, in accordance with the FDMA-type method, only two frequency bands are allocated to radiocommunications.

15 Claims, 2 Drawing Figures

METHOD OF TWO-WAY RADIOCOMMUNICATION BETWEEN FIXED STATIONS AND MOBILE STATIONS

BACKGROUND OF THE INVENTION

The present invention relates to a method of two-way radiocommunication between fixed stations and mobile stations using on the one hand a set of communication channels a first group of which forming a "down" path is reserved for transmission from all the fixed stations and a second group of which forming an "up" path is reserved for transmission from all the mobile stations, each pair of channels formed by one of the communication channels on the "up" path and by one of the communication channels on the "down" path being capable of handling a two-way communication between any one of the fixed stations and any one of the mobile stations and on the other hand at least one semaphore channel used to provide control of communications.

In general, the invention is applicable to two known methods of radiocommunication: the time-division multiple-access type, called TDMA, and the frequency-division multiple-access type, called FDMA. In accordance with the classical technique, these methods are used in a cellular network, divided geographically into patterns of elementary zones, called cells. Each pattern comprises a predetermined number of cells, for example equal to 7, 9, 12 or 16 cells. The patterns are regular and periodically distributed. Each cell is generally hexagonal and has a fixed station at its centre.

In accordance with the radiocommunication method of the FDMA type, for example that described in the French patent application No. 2 376 570, the transmission means of the fixed station of each cell are narrow-band transmitters which are equal in number to the maximum number of mobile stations able to communicate with the fixed station. In each pattern the frequency bands allocated respectively to the fixed stations are different in order to avoid mutual interference between stations in the pattern. Each channel, having a different frequency from that of all the other channels of the pattern in which the fixed station is included, is thus assigned to a communication between a fixed station and a mobile station. A dynamic frequency allocation may also be provided for. It consists in placing certain channels at the disposital of all the cells; when a cell uses one of these channels, that channel cannot be used by the other stations of the same pattern. This is described in the European patent application No. 0 036 146.

In accordance with the radiocommunication method of the TDMA type, the transmitters of the fixed stations of the cells in each pattern are wide-band transmitters. Each transmitter of a fixed station is allocated certain time intervals of a numerical frame equal in number to the maximum number of mobile stations able to communicate with the fixed station. Each communication between the fixed station and a mobile station thus occupies a time interval of the frame which is allocated during the entire communication. A dynamic time allocation of certain time intervals may also be provided for in a manner similar to the dynamic allocation of the FDMA type.

Mention should also be made of a mixed radiocommunication method TDMA-FDMA which consists in allocating to each fixed station a frequency band in which a numerical frame makes it possible to effect connections with all the mobile stations of the cell. This method will not, however, be considered in the context of the present invention.

The communications being effected in the duplex mode, i.e. in both directions simultaneously, the mobile stations have transmission means similar to those of the three methods described above.

In accordance with the three methods, the division of the fixed stations into cellular patterns is mainly necessitated by the phenomenon of interference which prohibits the re-utilization by a neighbouring cell of a radio telephone channel already assigned to another cell. The weakness of these three methods is poor utilization of the frequency spectrum: if one has, for example, a pattern of order 7, each cell only utilises one-seventh of the available frequencies. The capacity of the system might be increased by reducing the size of the cells, but this increases their number and hence the cost of the system as a whole.

The aim of the present invention is to remedy this drawback.

SUMMARY OF THE INVENTION

To that end, a method of the kind mentioned in the preamble for two-way radiocommunication between fixed stations and mobile stations is remarkable for the fact that each fixed station detects the channels in the "up" path which are occupied by communications between fixed stations and mobile stations located in a first interference zone of the said fixed station for which the power level received from the said mobile stations exceeds a first predetermined threshold and stores the addresses of the detected channels, for the fact that each fixed station continuously transmits by means of the semaphore channel assigned to the fixed station the addresses of the channels occupied by communications from mobile stations located in the interference zone of the said fixed station, and by the fact that, in order to establish communication with the fixed station selected, the mobile station detects the channels in the "down" path which are occupied by communications between mobile stations and fixed stations located in a second interference zone of the said mobile station for which the power level received from the said fixed stations exceeds a second predetermined threshold, and the said mobile station stores the addresses of the detected channels and selects a pair of free communication channels whose address is different from the addresses of the occupied channels detected by the said mobile station and from the addresses of occupied channels transmitted by means of the semaphore channel assigned to the said fixed station selected.

As a result, the idea of patterns and in particular that of the distribution of frequencies or time intervals between cells is no longer implemented in accordance with the invention, at least so far as the routing of communications is concerned. However, this idea of patterns is retained for the operation of the semaphore channel used for the procedure of establishing links.

Thus, thanks to the invention, when the propagation conditions are poor, the range is low and better use is consequently made of the channels. This is interesting for residential areas where the need for communications is great.

Other advantages and characteristics of the invention will emerge more clearly from the following description given with reference to the corresponding drawings attached, in which:

DETAILED DESCRIPTION OF THE PREFERRED EMBODIMENT

Figure 1:
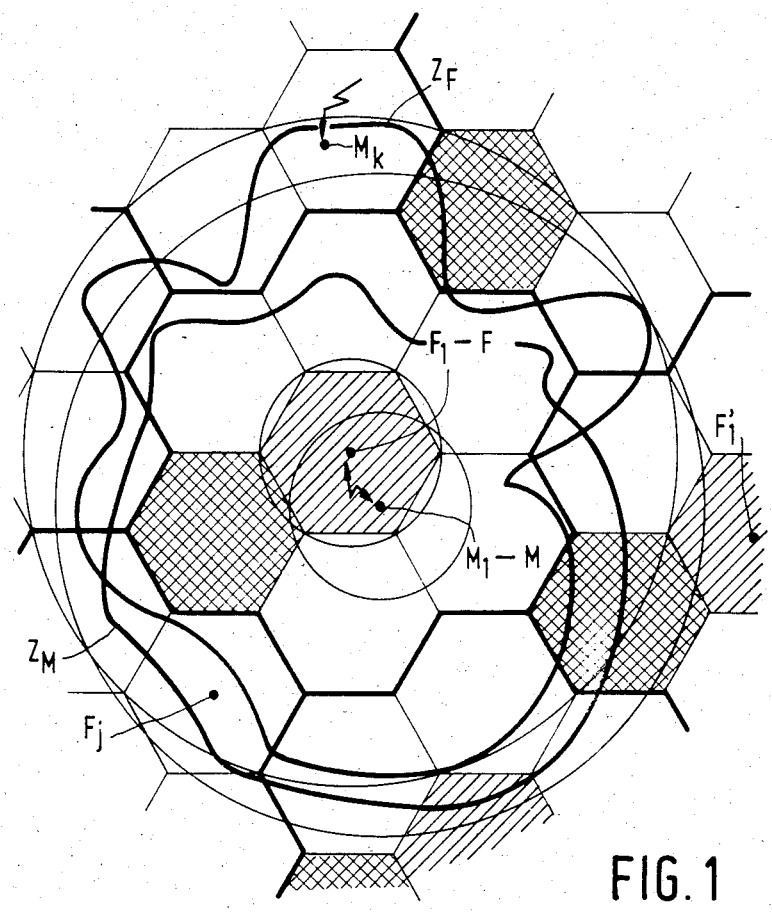
FIG. 1 shows the relative positions of the fixed stations and of the mobile stations as well as the zone within which a fixed station causes interference and the zone within which a mobile station causes interference.

Represented in FIG. 1 are a fixed station F and a mobile station M of a cellular radiocommunication system according to the invention. In the following, reference will be made to a system of the time-division multiple-access type (TDMA). Each fixed station transmits to mobile stations messages in the channels dynamically allocated in a first numerically multiplexed path called the "down" path; each mobile station transmits to one of the fixed stations a message in a channel dynamically allocated in a second numerically multiplexed path called the "up" path. It is possible to utilise a diversity of space, but this is only necessary with the FDMA system.

It is possible to define around every fixed station F a zone $Z_F$, referred to as an interference zone, inside which every mobile station M may suffer interference from the station F with a reception power in excess of a first predetermined power threshold. Conversely, every mobile station M situated in the zone $Z_F$ may cause interference to the station F with a reception power in excess of a second predetermined power threshold.

An interference zone $Z_M$ around the mobile station M is defined in a similar manner. Every fixed station situated in the zone $Z_M$ may suffer interference from the mobile station M, and the mobile station M may suffer interference from every fixed station situated in the zone $Z_M$.

It is evident that in order for two-way communication to take place between the stations F and M it is necessary but not sufficient that the stations F and M be situated in the intersection $Z_F \cap Z_M$ of the zones $Z_F$ and $Z_M$. The establishment of such communication via two channels respectively in the "down" and "up" paths generates perturbations which it is necessary to remedy. The transmission of a message in the channel of the "down" path by the fixed station is capable of disturbing at least one mobile station $M_k$ located in the zone $Z_F$ and capable of receiving a message in the said channel transmitted by another fixed station. The transmission of a message in the channel of the "up" path by the mobile station M is capable of disturbing at least one fixed station $F_j$ located in the zone $Z_M$ and capable of receiving a message in the said channel transmitted by another mobile station. The communication to be established between the stations F and M should thus not disturb either the other communications with the station F in the "up" and "down" directions, or the reception of the fixed stations $F_j$ in the zone $Z_M$, or the reception of the mobile stations $M_K$ in the zone $Z_F$.

One aspect of the invention is that the perturbations are suppressed on the one hand by associating for each communication a predetermined channel of the "up" path with a predetermined channel of the "down" path, as for a cell according to the prior art, and on the other hand by meeting the following two conditions:

(1) During a communication, at least the fixed station F and the mobile station M transmit continuously channel marking signals constituted for example by the maintenance of an unmodulated carrier wave in order that the two channels utilised for the communication will not be selected for any other communication with the fixed station F;

(2) The ratio between the transmission power of a mobile station and a first predetermined threshold for the receiver of the fixed station is equal to the relation between the transmission power of a fixed station and a second predetermined threshold for the receiver of the mobile station. In these conditions, the ranges in the direction from the fixed station to the mobile station and in the direction from the mobile station to the fixed station are equal.

In order that the mobile station M may select the best received fixed station, periodic signals, serving also for synchronization of the frame of the mobile stations in the FDMA systems, are continuously transmitted by the fixed stations in a channel of the "down" path, referred to as a semaphore channel. Multiplexed in the semapore channel are time intervals originating from the various fixed stations following a pattern of the order 7, 9, 12 or 16 in such a way as to avoid all interference. The mobile station M thus itself selects the fixed station which is most strongly received.

The mobile station M recognises the channels of the "down" path occupied by communications with the fixed stations $F_j$ situated in the zone $Z_M$ and stores the addresses of these occupied channels.

The mobile station M is not capable of recognising the channels of the "up" path occupied by mobile stations $M_k$ situated in the intersection $Z_F \cap \overline{Z}_M$, where $\overline{Z}_M$ designates the complementary zone of the zone $Z_M$. In order that the mobile station M may select a pair of unoccupied channels, the fixed station F transmits in the time intervals of the semaphore channel assigned to the said fixed station the list of addresses of the channels occupied by the mobile stations, such as the station $M_k$, situated in the zone $Z_F$. In these conditions the mobile station M, after having selected the station F by comparison of the powers received in the various time intervals of the semaphore channel, is capable of selecting a pair of unoccupied channels for establishing the duplex link with the fixed station F, and thus of calling a requested subscriber via the station F.

A similar problem is also to be solved when the fixed station F has to call a mobile station, like the station M connected to it at the moment of the call.

The fixed station F knows the channels of the "up" path occupied by communications with the mobile stations situated in the zone $Z_F$, and stores the addresses of these occupied channels.

The fixed station F is not capable of knowing the channels of the "down" path occupied by communications with fixed stations $F_j$ situated in the intersection zone $\overline{Z}_F \cap \overline{Z}_M$, where $\overline{Z}_F$ designates the complementary zone of the zone $Z_F$. The direct selection by the fixed station F of a channel on the "down" path, and hence of a pair of channels, one on the "up" path and one on the "down" path, is consequently impossible.

Another aspect of the invention is that, to call the mobile station M, the fixed station F transmits the address of the mobile station M to be called in the time interval of the semaphore channel assigned to the fixed station in the "down" path. The mobile station M is then able to select a pair of unoccupied channels by means of the call procedure by the mobile station described above, in response to the detection of the address of the mobile station and on the basis of the addresses of the occupied channels transmitted in the time interval of the semaphore channel assigned to the fixed station F and of the addresses of the occupied channels stored directly by the mobile station.

If, as a consequence of the movement of the mobile station M, the signals received by the station M and originating from station F are disturbed by signals transmitted by another fixed station $F_j$ in the same channel of the "down" path, the mobile station searches for a new pair of free channels. The assignment of the communication in progress to a new pair of channels is automatically signalled at the head of the message.

Similarly, if as a consequence of the movement of the mobile station $M_k$ in the zone $Z_F$ the signals received by the station F and originating from the station M are disturbed by the signals transmitted by the station $M_k$ in the same channel of the "up" path, the fixed station F reports this interference to the mobile station M. Such interference is indicated for example by a predetermined bit included in the head of the message in the channel of the "down" path, inviting the mobile station M to change the pair of channels in accordance with the procecure described above.

If as a consequence of the movement of the mobile station M the analysis of the signals in the various time intervals of the samaphore channel indicates that the power received from another fixed station is higher by an appreciable value, typically 10 dB, than the power received from the fixed station F, the mobile station M must change channel. To do so the mobile station M proceeds to select a pair of channels on the basis of the addresses of the occupied channels transmitted continuously in the time interval of the semaphore channel assigned to the other fixed station, as for a call by the mobile station. The mobile station M signals its change of the fixed station with which it is in communication by modifying a part of the head of the last time interval transmitted to the first fixed station, then by modifying a part of the head of the first time interval transmitted to the new fixed station. The modifications may consist of inserting respectively in the message heads the addresses of the first fixed station and of the new fixed station.

Suppose, by way of example, that the fixed stations are distributed in a cellular network of a regular periodic pattern. Each pattern comprises m=7 hexagonal cells each containing a fixed station, as shown in FIG. 1. Each fixed station is substantially at the centre of the hexagonal cell. As already stated, all the fixed stations of the system transmit in a "down" path having a first predetermined carrier frequency and all the mobile stations of the system transmit in an "up" path having a second predetermined carrier frequency. Typically, the interference zone of a station is completely outside a small circle of radius c and inside a large circle of radius $R=c\sqrt{13}$, where c is the length of a side of a hexagonal cell.

Figure 2:
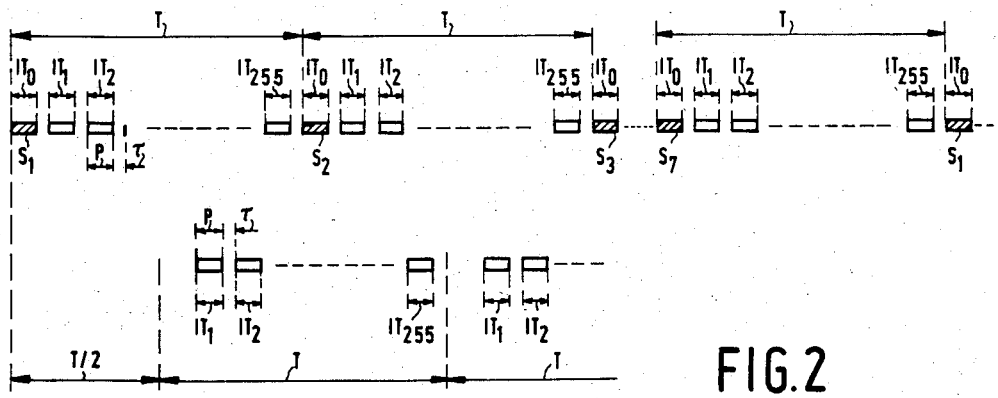
FIG. 2 shows frames of the first or "down" path and frames of the second or "up" path for a radiocommunication method of the TDMA type in accordance with the invention.

Both the "down" path and the "up" path contain 256 time-division multiplexed numerical channels in a frame having a period T=125 ms, as shown in FIG. 2. In a frame a time interval $IT_0$ to $IT_{255}$ having a duration equal to 409.6 μs is assigned to a channel and permits the transmission of a package of at the most 2048 bits, which corresponds to a real output of 5 Mbits/s and to an elementary interval of 0.2 μs per bit. A check interval $\tau = 78.4$ μs is available at the end of each interval $IT_0$ to $IT_{255}$ and corresponds to the duration of the transmission between a fixed station and a mobile station, for a maximum range R of 23.5 km.

In the "up" path the first time interval $IT_0$ of each frame is not utilized. In the "down" path the first interval $IT_0$ of each frame is allocated to the semaphore channel. The fixed stations of the cells having the same relative position in the patterns, like the hatched or cross-hatched cells in FIG. 1, each transmit a message in the same interval of the samaphore channel every $125 \times 7 = 875$ ms. In the semaphore channel the seven successive time intervals $IT_0$, marked $S_1$ to $S_7$ in FIG. 2, are respectively assigned in each pattern to the seven cells of the pattern. For example, the fixed stations of the hatched cells of the patterns in FIG. 1 transmit simultaneously in the semaphore channel $S_1$. Knowing that the interference zone $Z_M$ of a mobile station is included in a large circle of radius $R=c\sqrt{13}$, every mobile station such as the station $M_1$ in communication with a fixed station $F_1$ of a pattern cannot be disturbed by any other fixed station in a cell, such as the station $F'_1$, having the same relative position in a neighbouring pattern.

Each package in one of the time intervals $S_1$ to $S_7$ of the semaphore channel contains synchronization words such as three identical octets for all the fixed stations. In each mobile station a clock regeneration circuit reconstitutes clock signals at the bit frequency of 5 MHz and at the frame frequency of 8 Hz on the basis of the synchronization words. The mobile stations are synchronized to the fixed stations and are thus slaves of the fixed stations, called masters.

On account of the wide band used in the TDMA method, intersymbol interference arises from the multiple propagation paths. An autoadaptive equalizer using synchronization words is therefore necessary. The equalizer contains at least an autoadaptive transversal filter whose weighting coefficients are calculated as a function of a correlation algorithm between the synchronization words received and the synchronization words that have previously been stored in the memory and which are identical with those transmitted by the fixed stations. In addition, according to the invention, a level detector in the mobile station compares the levels of the seven time intervals $S_1$ to $S_7$ of the semaphore channel in order to select the fixed station corresponding to the strongest reception power.

Each package transmitted by a fixed station in the semaphore channel also contains at least the following information:

The marking list of pairs of communication channels occupied by mobile stations situated in the zone $Z_F$ of the fixed station in order that a mobile station wishing to communicate with the fixed station may select a free pair of channels.

If necessary, the address of a requested mobile station in communication with the cell of the fixed station.

An address word of the fixed station.

The marking list is continuously updated in the memories of the fixed station. It is locally determined by the fixed station as already stated.

The intervals $IT_1$ to $IT_{255}$ of the frames of the "up" and "down" paths are occupied by time-division multiplexed channels assigned to the transmission of communications such as telephony or data. Each communication between a fixed station and a mobile station occupies a time interval in the "up" path and a time interval in the "down" path having the same rank 1 to 255 in the frames. The frame of the "up" path is shifted relative to the frame of the "down" path by a period equal to about half the period of the frame, i.e. 1/16 s. This time shift gives each station, fixed or mobile, a maximum delay for passing from the transmission state to the receiving state or vice versa.

Each package of 2048 bits in an interval $IT_1$ to $IT_{255}$ of the communication channel comprises a heading of typically 48 bits and a field of information of 2000 bits.

The first 24 bits of the heading are synchronization bits enabling the clock signals to be restored to the bit frequency and frame frequency and permitting equalisation of the received package, as described above for the synchronization bits of the semaphore channel. The other 24 bits of the heading serve for identifying the destination address and, where applicable, for indicating a change-of-channel request from the fixed station or for indicating a change of channel or of fixed station by the mobile station. Since the search for a free channel or a fixed station is decided by the mobile station, the heading of the channel of the "up" path also comprises, as already mentioned, the address of the new fixed station selected by the mobile station.

The information field of a package contains the telephony or data words or the words of a particular message belonging to the communication and corresponding to a channel with an output of $2000/0.125=16$ kbits/s. The information field of a communication channel in the "up" path may be occupied by a particular message. Thus, this particular message may be a connecting signal indicating to the fixed station that it has been selected by the mobile station as the station for communication. On the other hand, the same message is sent when the subscriber of the mobile station puts his mobile unit into the operating condition.

From the foregoing description it appears that a mobile station performs the following principal operations prior to any communication:
  continuous selection of the fixed station by discrimination between the power levels received in the time intervals $S_1$ to $S_7$ of the semaphore channel;
  transmission of a signal of connection to the fixed station in order that the mobile station can be caklled;
  storage of the address of the fixed station and of the marking list of the occupied channels in the interference zone of the selected fixed station;
  storage of the addresses of the occupied channels in the interference zone of the mobile station;
  selection of a pair of free communication channels whose address has not yet been stored in the mobile station.

Although the invention has been described in the foregoing with reference to a time-division multiple-access radiocommunication system, the invention also applies to a frequency-division multiple-access (FDMA) radiocommunication system. In the case of a transmission of the FDMA type, the time-division channels are replaced by frequency-division multiplexed channels, each channel being assigned to one frequency. The means of reception of the fixed stations and of the mobile stations are constituted by fast-scan receivers in the narrow bands of the frequencies assigned respectively to the "down" path and to the "up" path. The speed of analysis of the power levels received is the same as for the TDMA system if the receiver varies in frequency by steps each having a period equal to a time interval of the TDMA frame.

According to another variant of the TDMA-type method in accordance with the invention, several pairs of numerical "up" and "down" paths may be provided when the number of time-division multiplex channels in a numerical path is lower than the traffic required for a large number of mobile stations. In this case, each fixed station comprises several numerical transmitters and receivers assigned respectively to frequency couples of the numerical paths. On the other hand, each mobile station only uses a single predetermined pair of numerical paths, one "up" and one "down".

According to another variant, several time intervals may be offered to a single link, permitting data transmissions with multiple outputs of 16 kbits/s.

What is claimed is:

1. A method for selecting channels for two-way radiocommunication between fixed stations and mobile stations using a set of communication channels wherein a first group of said channels forms a "down" path that is reserved for transmission from all the fixed stations and a second group of said channels forms an "up" path that is reserved for transmission from all the mobile stations, and at least one semaphore channel, each pair of communication channels formed by one of the communication channels of the "up" path and one of the communication channels of the "down" path being capable of handling two-way communication between any of the fixed stations and any of the mobile stations comprising the steps of: each fixed station detecting the channels in the "up" path occupied by communications from mobile stations for which the power level received from the said mobile stations exceeds a first predetermined threshold; each fixed station storing the addresses of the detected channels; each fixed station continuously transmitting via the semaphore channel assigned to said fixed station the addresses stored by the fixed station, and in which, in order to establish communication with a fixed station the further steps of: a mobile station detecting the channels in the "down" path occupied by communications from fixed stations for which the power level received from the said fixed stations exceeds a second predetermined threshold; said mobile station storing the addresses of the detected channels and selecting a pair of free communication channels whose addresses are different from the addresses of the busy channels detected by the said mobile station and from the addresses of busy channels transmitted via the semaphore channel allocated to the selected fixed station.

2. The method as claimed in claim 1, in which the channels are frequency-division multiplexed.

3. The method as claimed in claim 1, in which the channels are time-division multiplexed.

4. The method as claimed in any of claims 1 to 3, wherein a time interval ($S_1$ to $S_7$) in said at least one semaphore channel is assigned to each fixed station and carries periodic synchronization signals continuously transmitted by each said fixed station, and in which, in order to establish communication with one of the fixed stations, each mobile station (M) compares the power levels of the synchronization signals received in the various time intervals ($S_1$ to $S_7$) of the semaphore channel and continuously selects the fixed station whose reception power is highest in order that communication can be established between the mobile station and the fixed station selected.

5. A method as claimed in claim 1, in which the ratio between the transmission power of a mobile station and the first predetermined reception threshold of a fixed station is equal to the ratio between the transmission power of a fixed station and the second predetermined reception threshold of a mobile station.

6. A method as claimed in claim 4, in which the mobile station (M), upon being put into service, transmits its address along a free channel of the "up" path to the selected fixed station (F) in order that the said selected fixed station may transmit at any given moment in the time interval ($S_1$ to $S_7$) of the semaphore channel assigned to the fixed station a call signal to the mobile station.

7. The method as claimed in claim 4, in which when the mobile station (M) detects interference in the channel of the "down" path assigned to communication between the mobile station and the said selected fixed station (F), the mobile station (M) automatically searches out a new pair of free channels and transmits in the channel of the "up" path assigned to the said communication a signal for changing the pair of channels.

8. The method as claimed in claim 4, in which, when the said selected fixed station (F) detects interference in the channel of the "up" path assigned to communication between the mobile station (M) and the selected fixed station, the selected fixed station (F) transmits in the channel of the "down" path assigned to the said communication a signal for changing the pair of channels, which "invites" the mobile station (M) to search out a new pair of free channels and to transmit in the channel of the "up" path assigned to the said communication the address of the new pair of free channels.

9. The method as claimed in claim 4, in which, following a movement of the mobile station (M) and in response to the detection by the mobile station of a power level received in any of the time intervals ($S_1$ to $S_7$) of the semaphore channel higher than the power level received in the time interval of the semaphore channel assigned to the said selected station (F), the mobile station changes its fixed communicating station by selecting a pair of free channels, mainly on the basis of the occupied-channel addresses transmitted in the time interval of the semaphore channel corresponding to the higher power level received.

10. The method as claimed in claim 9, in which the change in fixed station is signalled by the mobile station by modifying a part of the heading of the first time interval transmitted to the first fixed station, and then modifying a part of the heading of the first time interval transmitted to the new fixed station.

11. The method as claimed in claim 10, in which the fixed stations (F) are distributed in a cellular network having periodic patterns each comprising a predetermined number of cells each centrally including a fixed station, in which successive time intervals ($S_1$ to $S_7$) of the semaphore channel are allocated periodically and respectively to cells in each pattern, and each time interval of the semaphore channel is allocated to the fixed stations of cells having the same relative position in the patterns.

12. A method as claimed in claim 2, in which the ratio between the transmission power of a mobile station and the first predetermined reception threshold of a fixed station is equal to the ratio between the transmission power of a fixed station and the second predetermined reception threshold of a mobile station.

13. A method as claimed in claim 3, in which the ratio between the transmission power of a mobile station and the first predetermined reception threshold of a fixed station is equal to the ratio between the transmission power of a fixed station and the second predetermined reception threshold of a mobile station.

14. A method as claimed in claim 4, in which the ratio between the transmission power of a mobile station and the first predetermined reception threshold of a fixed station is equal to the ratio between the transmission power of a fixed station and the second predetermined reception threshold of a mobile station.

15. A method as claimed in claim 5 in which the mobile station (M), upon being put into service, transmits its address along a free channel of the "up" path to the selected fixed station (F) in order that the said selected fixed station may transmit at any given moment in the time interval ($S_1$ to $S_7$) of the semaphore channel assigned to the fixed station a call signal to the mobile station.

* * * * *